Patented July 8, 1941

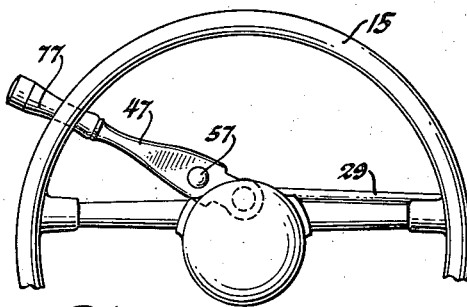
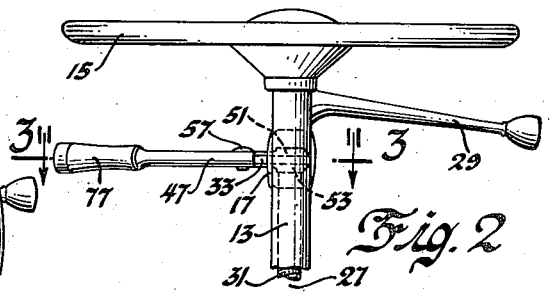
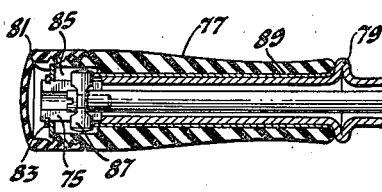
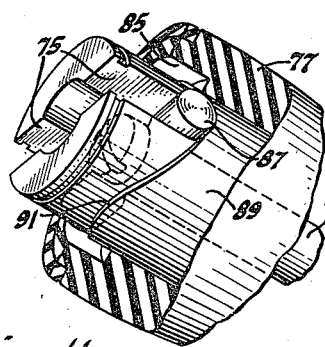
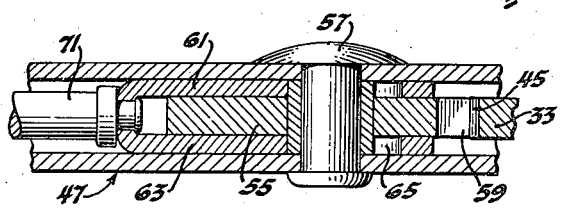
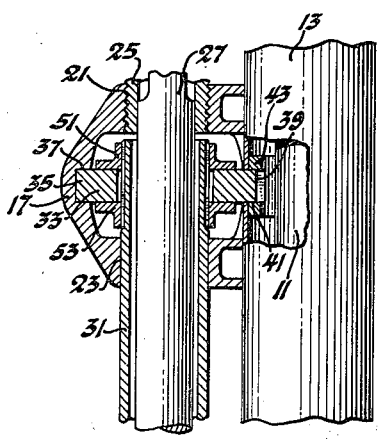

2,248,364

UNITED STATES PATENT OFFICE 2,248,364

EMERGENCY BRAKE

Albert E. Leach, Royal Oak, Mich., assignor to General Motors Corporation, Detroit, Mich., a corporation of Delaware Application December 29, 1939, Serial No. 311,446

1 Claim. (Cl. 74—485)

This invention relates to brakes and particularly to means for emergency operation of vehicle brakes.

An object of the invention is to provide conveniently accessible means for applying the brakes.

Another object is to provide lever means adjacent the steering wheel for convenient actuation by the hand normally holding the steering wheel. Safety is an important object, the location being such that the lever cannot be released accidentally by bumping or catching on clothing or robes.

Another object is found in the provision of a simple and easily operated releasing means for such a lever.

Other objects and advantages will be understood from the description which follows.

In the drawing:

Figure 1 is a top plan view of a vehicle steering wheel showing the position of the emergency lever relative thereto.

Figure 2 is a view of the same assembly in elevation.

Figure 3 is a section on line 3—3 of Figure 2.

Figure 4 is an enlarged perspective of the parts at the end of the lever.

Figure 5 is a section on line 5—5 of Figure 3, and

Figure 6 is a section on line 6—6 of Figure 3.

On the drawing, the steering shaft 11 is shown within a fixed tubular column 13. The hand wheel 15 is suitably connected for rotation of shaft 11.

A bracket 17 of suitable form is secured to the column by fastening means 19. The bracket has upper and lower openings at one side of the column, the openings being marked 21 and 23. Into opening 21 is threaded a sleeve 25 to rotatably support a shaft 27 which is intended to be both reciprocable and rotatable by means of a lever 29. This shaft 27 serves the purpose of gear shifting.

Surrounding shaft 27 is a tubular shaft 31. It is rotatably mounted in the bracket opening 23. Its upper end lies beneath sleeve 25. A ratchet plate 33 is provided with a lug 35 to fit a recess 37 in the bracket. It has another lug 39 entering a notch 41 in the steering column. Spaced members 43 within the steering column are spot welded thereto and engage the lug 39. The ratchet plate has a series of teeth 45 for engagement with a pawl such as is usually provided for holding emergency levers in operative position.

The emergency lever designated as a whole by numeral 47 may be formed from sheet metal as shown by Figure 3. It is hollow and terminates in upper and lower apertured ends 51, 53 located above and below the ratchet plate and keyed or otherwise secured to the hollow shaft 31. Within lever 47 is a pawl 55 pivoted to the opposite walls thereof by a pivot pin 57. The pawl has a tooth 59 adapted to engage the teeth of the ratchet plate. To withdraw the pawl from the ratchet plate it is embraced by a yoke having upper and lower arms 61 and 63. The yoke arms are formed with slots 65 to embrace the pivot and permit the yoke to reciprocate. It carries a lug 67 to engage a head 69 on the pawl and to thereby rotate the pawl when the yoke is moved to the left of the position shown by Figure 3. To the bight of the yoke is connected a rod 71. This rod extends to a point near the end of the lever. Suitable spring means 73 connected to the pawl and anchored as shown biases the pawl into engagement with the ratchet. The lever has at its ends diametrically opposite slots 75. A hand grip 77 is rotatable on the end of the lever. It is held from axial movement on the lever by a suitable abutment 79 at an intermediate point of the lever and by a washer 81 and retainer 83 adjacent the lever end. The end of the hand grip is recessed at 85 to prevent interference with a pin 87 suitably secured to the end of rod 71. Rotation of the pin is prevented by the engagement of its ends in the slot 75. Within and rigid with a hand grip is a tubular sleeve 89, its end being of cam formation as shown at 91, in Figure 4. This cam formation is adapted to engage the pin 87 as shown.

With the construction as described when the operator has occasion to apply the brake by means of the lever 47 he need only drop his hand from the steering wheel 15 to the grip 77 of the hand lever 47 and pull the same. It will be understood that suitable mechanical connections, not shown, are provided between the lower end of shaft 31 and the emergency brake operating parts. When the lever has been pulled sufficiently to apply the brake with the desired force it is held in position by the engagement of the pawl with the teeth 45 under the influence of spring 73. To release the pawl from the ratchet the operator merely rotates the grip 77. This rotation reciprocates the rod 71 and effects rotation of the pawl against the action of spring 73.

It will be seen by the construction described above that the operator can so easily reach the hand lever that it may be used jointly with the pedal to supplement the service operation. This is often desirable and may be necessary in the event of failure of the service brake system.

An important advantage of the easily accessible hand brake lever is found in traffic stops, particularly on up-hill grades where the car can be held by hand brake while shifting gears or starting in gear without car backing down grade while foot is moving from brake pedal to accelerator. It therefore reduces the need for "no back" devices.

I claim:

Emergency brake operating means for vehicles having a steering column and a steering wheel, said means including a bracket carried by said column, said bracket having upper and lower arms and a space between said arms, a brake actuating shaft journaled in one of said arms, a ratchet plate within said space and positioned by said bracket and column, said plate extending laterally from said bracket, a manually operable lever extending at right angles to said shaft and located beneath said steering wheel, said lever having a bifurcated end, the furcations embracing said ratchet plate and secured to said shaft, a pawl pivoted to said lever to engage said ratchet plate, a rotatable hand grip on said lever and means operably connected to said hand grip to release said pawl from said ratchet plate.

ALBERT E. LEACH.